(12) United States Patent  
Shuman et al.

(10) Patent No.: US 12,436,350 B2  
(45) Date of Patent: Oct. 7, 2025

(54) PRE-TERMINATED OPTICAL CABLE

(71) Applicant: Prysmian S.p.A., Milan (IT)

(72) Inventors: John Shuman, Yorba Linda, CA (US); Ian James Griffiths, Milan (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 18/412,904

(22) Filed: Jan. 15, 2024

(65) Prior Publication Data

US 2024/0151928 A1    May 9, 2024

Related U.S. Application Data

(63) Continuation of application No. 17/652,755, filed on Feb. 28, 2022, now Pat. No. 11,914,209.

(51) Int. Cl.
*G02B 6/44* (2006.01)
*G02B 6/38* (2006.01)

(52) U.S. Cl.
CPC ......... *G02B 6/4471* (2013.01); *G02B 6/3885* (2013.01); *G02B 6/443* (2013.01)

(58) Field of Classification Search
CPC .............................. G02B 6/4471; G02B 6/443
See application file for complete search history.

(56) References Cited

U.S. PATENT DOCUMENTS

| | | |
|---|---|---|
| 9,057,845 B2 | 6/2015 | Szilagyi et al. |
| 2008/0175548 A1 | 7/2008 | Knecht et al. |
| 2011/0188809 A1 | 8/2011 | LeBlanc et al. |
| 2017/0102504 A1 | 4/2017 | Follingstad |
| 2018/0299633 A1 | 10/2018 | Thompson et al. |
| 2020/0026015 A1 | 1/2020 | Wells et al. |
| 2022/0163747 A1* | 5/2022 | Cooke ................... G02B 6/545 |

FOREIGN PATENT DOCUMENTS

WO    2019005546 A1    1/2019

OTHER PUBLICATIONS

Partial European Search Report, Reference No. P097733EP, Application No. 23156742.0-1020, Applicant: Prysmian S.p.A, Jul. 10, 2023, 13 pages.

* cited by examiner

*Primary Examiner* — Sung H Pak
(74) *Attorney, Agent, or Firm* — Slater Matsil, LLP

(57) ABSTRACT

An optical cable includes a main body and a termination segment extending from an end of the main body. The main body includes middle portions of optical fibers. The termination segment includes end portions of the optical fibers and multi-fiber connectors attached to the end portions of the optical fibers. The multi-fiber connectors are staggered along a length of the termination segment.

19 Claims, 11 Drawing Sheets

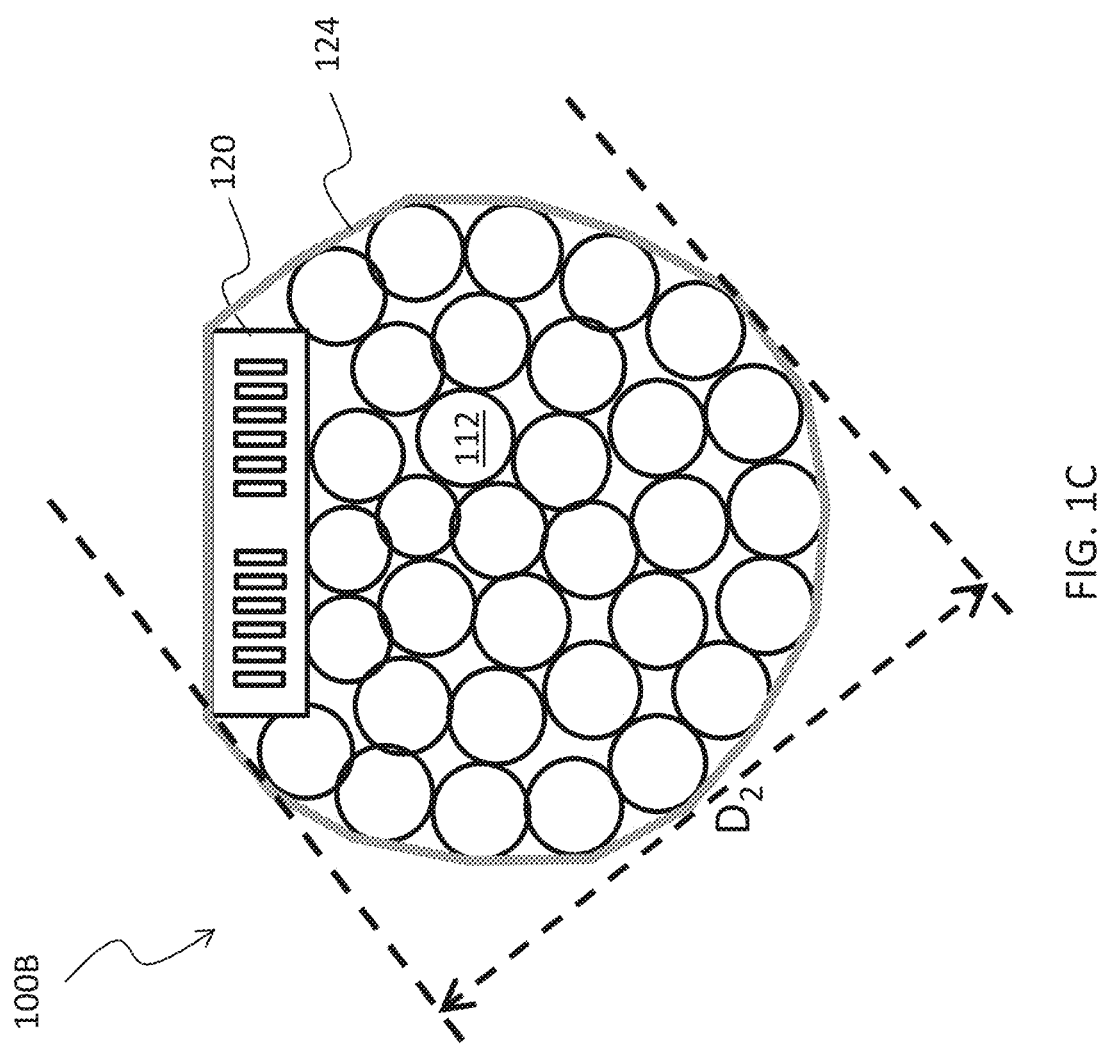

PRE-TERMINATED OPTICAL CABLE

CROSS-REFERENCE TO RELATED APPLICATIONS

This application is a continuation of U.S. patent application Ser. No. 17/652,755, filed on Feb. 28, 2022, which application is hereby incorporated herein by reference.

TECHNICAL FIELD

The present invention relates generally to optical cables, and, in particular embodiments, to an optical cable having staggered pre-terminated fibers.

BACKGROUND

Optical fibers are very small diameter glass strands capable of transmitting an optical signal over great distances, at very high speeds, and with relatively low signal loss relative to standard copper wire networks. Optical cables are therefore widely used in long distance communication and have replaced other technologies such as satellite communication, standard wire communication, etc. Besides long distance communication, optical fibers are also used in many applications such as medicine, aviation, computer data services, etc.

There is a growing need in many applications (e.g., hyperscale computing) for optical cables that are able to transfer high data rates while taking up minimum space. Such a need may arise in servers where space for the optical fiber is a critical limiting factor. Installing of high fiber count cables is very time consuming and expensive because of the high number of fiber connections that need to be prepared and spliced/terminated requiring skilled people and specialized equipment.

Optical cables are often installed by pushing, pulling and or blowing in ducts. The inner size of the duct determines the maximum diameter of a cable that can be installed in a certain duct. Pre-terminated optical cables are useful for saving time and expense during installation of the optical cables, but the connectors of pre-terminated optical cables may present challenges for installation through ducts.

SUMMARY

In accordance with an embodiment, an optical cable includes: a main body including middle portions of a plurality of optical fibers, the main body having a first outer diameter; and a first termination segment extending from a first end of the main body, the first termination segment having a second outer diameter equal to or smaller than the first outer diameter, the second outer diameter being a maximum diameter of the first termination segment through any cross-section of the first termination segment along the length of the first termination segment, the first termination segment including: first end portions of the plurality of optical fibers; and a first plurality of multi-fiber connectors, each multi-fiber connector of the first plurality of multi-fiber connectors being attached to respective first end portions of the plurality of optical fibers, where the first plurality of multi-fiber connectors are staggered along a length of the first termination segment.

In accordance with another embodiment, an optical cable includes: a plurality of tubes, each of the plurality of tubes including a respective plurality of optical fibers; and a plurality of multi-fiber connectors, each multi-fiber connector of the plurality of multi-fiber connectors being attached to an end of a respective tube of the plurality of tubes, the plurality of multi-fiber connectors being staggered along a termination segment of the optical cable, the termination segment being at the end of a main body of the optical cable, where a largest outer diameter of the termination segment is equal to or smaller than an outer diameter of the main body.

In accordance with yet another embodiment, a method of manufacturing a pre-terminated optical cable includes: exposing a plurality of tubes by removing an outer jacket of an optical cable from a termination segment of the optical cable, the termination segment extending from a main body of the optical cable, the main body having a first outer diameter; setting respective lengths of the plurality of tubes to be staggered from each other; terminating optical fibers of the plurality of tubes with multi-fiber connectors; and binding the plurality of tubes and the multi-fiber connectors in the termination segment with a wrapper, where after binding the plurality of tubes and the multi-fiber connectors, the termination segment excluding the wrapper has a second diameter, the second diameter being the same or smaller than the first diameter.

It is to be understood that both the foregoing general description and the following detailed description are exemplary and explanatory only and are not restrictive of the disclosure, as claimed.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A-1C illustrate an optical cable in accordance with an embodiment, wherein FIG. 1A illustrates a side view of the optical cable, FIG. 1B illustrates a cross-sectional view through a main body of the optical cable, and FIG. 1C illustrates a cross-sectional view through a termination segment of the optical cable;

FIGS. 3A-3C illustrate a optical cable in accordance with another embodiment, wherein FIG. 3A illustrates a side view of the optical cable, FIG. 3B illustrates a cross-sectional view through a main body of the optical cable, and FIG. 3C illustrates a cross-sectional view through a termination segment of the optical cable.

Figure 1A:
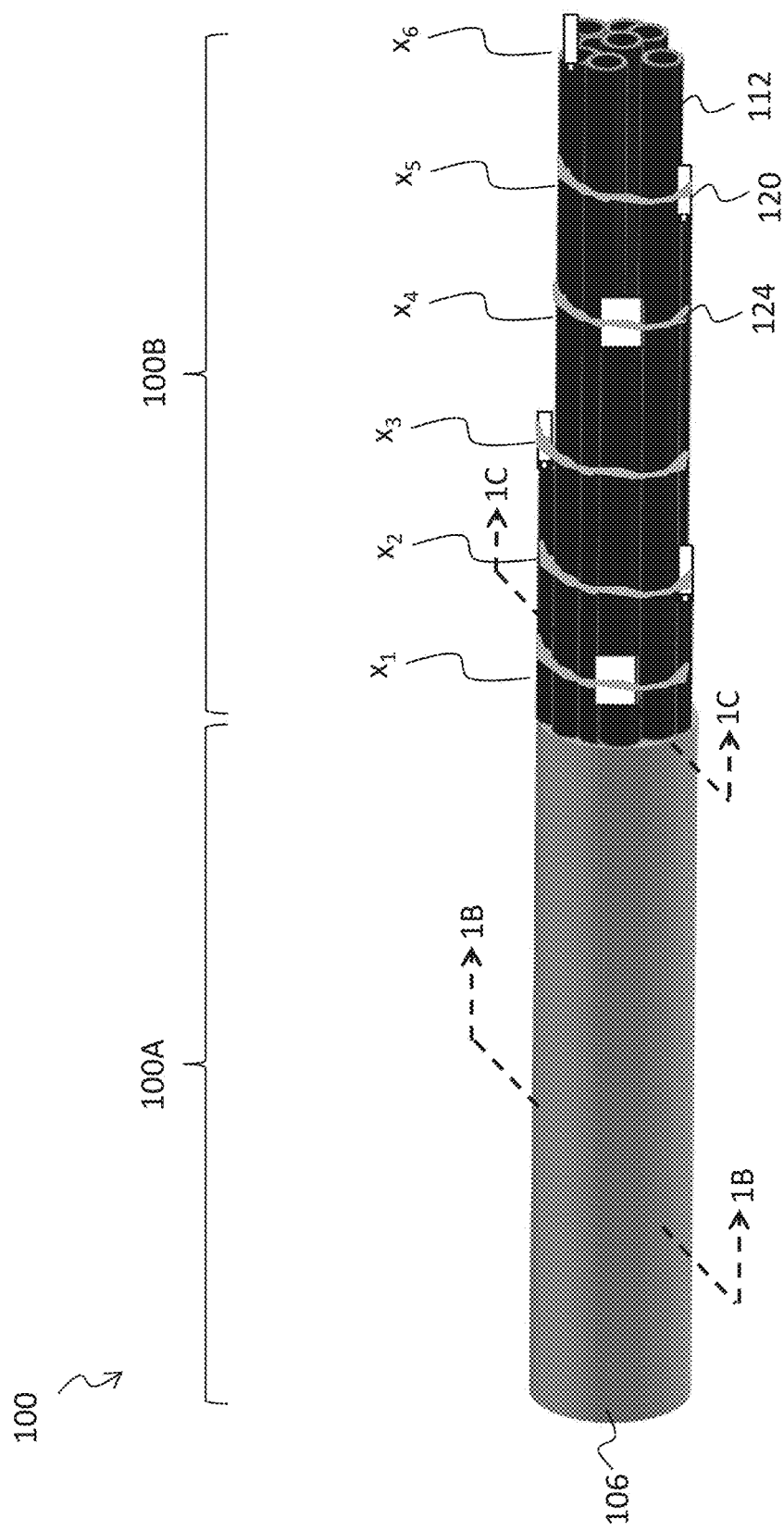

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments. According to one or more embodiments of the present disclosure, a pre-terminated optical cable is provided with a main body including a plurality of optical fibers surrounded by an outer jacket and a termination segment at an end of the main body. The termination segment includes pre-terminated optical fibers attached to multi-fiber connectors. The multi-fiber connectors are arranged in a staggered pattern around the termination segment so that the outer diameter of the termination segment is equal to or smaller than the outer diameter of the main body. A protection cover that is temporary and removable is put around the termination segment and the main body for protection of the optical cable during installation. The protection cover is thin (e.g., the increase in diameter caused by the temporary wrapper is less than 10%) so that it does not contribute much to the additional diameter of the optical cable during the installation process, after which it may be removed. This enables the installation of the optical cable into a same duct size as intended for an optical cable without attached connectors or a protection cover.

The outer diameter of the termination segment being equal to or smaller than the outer diameter of the main body is desirable in order to enable the installation of pre-terminated optical cables (also referred to as pre-connectorized optical cables) with high optical fiber counts (e.g., 144 to 13824 optical fibers per cable) through ducts suitable for optical cables without attached connectors. Attaching connectors to optical cables prior to installation to form pre-terminated optical cables reduces installation time of the optical cables significantly, Labor costs for installation may be significantly reduced by removing the time-intensive and skill-intensive step of optical fiber splicing from the installation process. For example, terminating the optical fibers prior to installation will remove the need to splice optical fibers during installation. Reducing the installation time and necessary labor skill for installation may remove capital costs that cannot be depreciated. Because the outer diameter of the termination segment of the pre-terminated optical cable (excluding the temporary protection cover) is equal to or smaller than the outer diameter of the main body, the pre-terminated optical cable may be installed through the same ducts used for unterminated optical cables. As such, existing ducts may be used to install the pre-terminated cable. This meets a significant market need for pre-terminated high fiber count optical cables in hyperscale computing that is currently unmet.

Figure 1B:
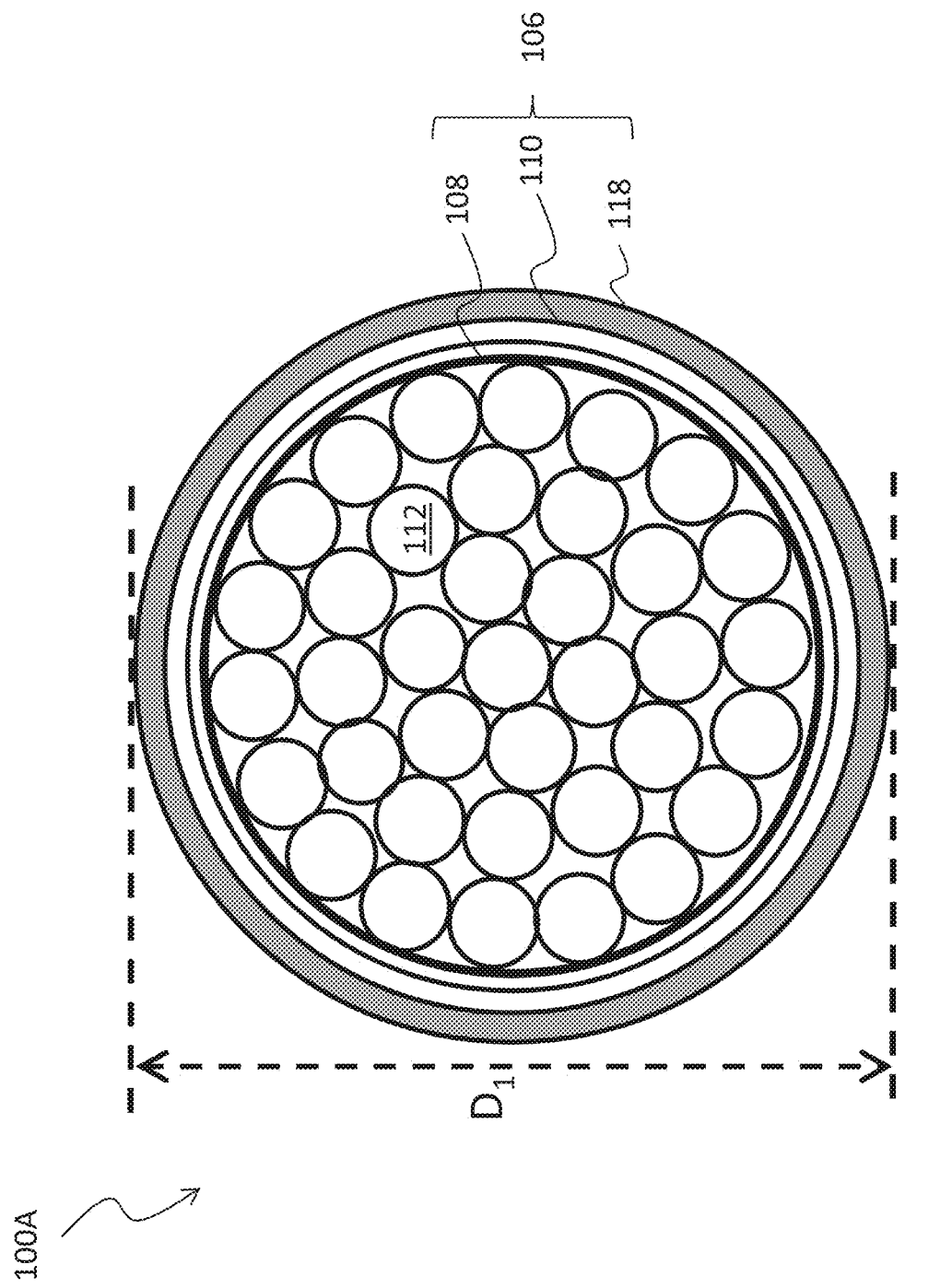

FIGS. 1A-1C illustrate an optical cable 100 in accordance with some embodiments. FIG. 1A illustrates a side view of the optical cable 100. FIG. 1B illustrates a cross-sectional view along cross-section 1B-1B through a main body 100A of the optical cable 100 as illustrated in FIG. 1A. FIG. 1C illustrates a cross-sectional view along cross-section 1C-1C through a termination segment 100B of the optical cable 100.

Referring first to FIG. 1A, in one or more embodiments, the optical cable 100 includes a main body 100A and a first termination segment 100B (also referred to as a termination segment 100B) on one or both ends of the main body 100A. The termination segment 100B may have a length in a range of 0.5 m to 10 m, such as 5 m.

In some embodiments, the optical cable 100 includes a plurality of tubes 112, and each tube 112 of the plurality of tubes 112 includes a respective plurality of optical fibers. The optical fibers may be arranged in flexible ribbons (see below, FIGS. 1D-1F), in flat ribbons, or may be loose fibers. In the main body 100A, the plurality of tubes 112 are surrounded by an outer layer 106. In the termination segment 100B, the outer layer 106 is removed and the plurality of tubes 112 are exposed. In some embodiments, the optical cable 100 includes a central strength member (see below, FIGS. 3A-3C).

In other embodiments, the optical cable 100 is a central tube cable, with a single central tube including a plurality of optical fibers that may be arranged in flexible ribbons (see below, FIGS. 1E-1F), in flat ribbons, or may be loose fibers. A strength system may surround the central tube, such as a layer of strength yarns or strength members attached to or embedded in the outer sheath of the central tube cable.

Still referring to FIG. 1A, in the termination segment 100B, each tube 112 of the plurality of tubes 112 are attached at its respective end to a connector 120 (also referred to as a multi-fiber connector). The connector 120 may be any suitable multi-fiber connector. In some embodiments, the connector 120 can terminate a number of optical fibers in a range of 12 to 144, such as 24 optical fibers. The optical fibers contained in each tube 112 are terminated in the connector 120. The optical fibers may subsequently be connected through the connector 120 to other optical fibers or data ports during installation in, for example, a hyperscale computing facility. Although FIG. 1A illustrates each tube 112 as terminated with a single respective connector 120, it should be appreciated that this is a non-limiting example. In various embodiments, two or more tubes 112 may be terminated by single connectors 120, or single tubes 112 may include optical fibers terminated by two or more respective connectors 120. The termination segment 100B may include a total number of connectors 120 in a range of 5 to 500.

As illustrated in FIG. 1A, the connectors 120 are staggered along the length of the termination segment 100B. For example, in some embodiments the connectors 120 are positioned at n axial positions $x_i$ (with the index i running from 1 to n) around the termination segment 100B. It should be appreciated that although FIG. 1A illustrates axial positions $x_1$ to $x_6$, the termination segment 100B may extend beyond the right boundary of FIG. 1A to an axial position $x_n$ where n is greater than 6. In some embodiments, n is in a range of 10 to 80.

The connectors 120 are arranged at staggered distances from the main body 100A in order to keep the diameter of the termination segment 100B equal to or less than the diameter of the main body 100A. A single connector 120 is arranged at the position $x_1$ (closest to the main body 100A) and two or more connectors 120 are arranged at the position $x_n$ (farthest from the main body 100A). As the distance from the main body 100A along the termination segment 100B increases, the number of tubes 112 decreases due to optical fibers of the tubes 112 being terminated by the connectors 120. This causes the termination segment 100B to decrease in thickness with increasing distance from the main body 100A. In various embodiments, single connectors 120 are arranged at positions closer to the main body 100A where the termination segment 100B is thicker, and two or more connectors 120 are arranged at positions farther from the main body 100A where the termination segment 100B is thinner.

The termination segment 100B is encircled by one or more wrappers 124 (also referred to as protective cover(s)) that bind the respective components of the termination segment 100B (e.g., the plurality of tubes 112 and the connectors 120) together. The one or more wrappers 124 hold the respect components of the termination segment 100B together during installation of the optical cable 100, such as while being pushed, pulled, or blown through a duct. This keeps the footprint of the termination segment 100B within the footprint of the main body 100A, which is advantageous for installing the optical cable 100 through ducts designed to accommodate unterminated optical cables (in other words, optical cables without pre-installed terminating connectors). The wrappers 124 may be any suitable binding material, such as tape, packaging wrap, plastic twine, braid, mesh, coil, the like, or combinations thereof. In some embodiments, the wrappers 124 are loops of packaging wrap that bind the connectors 120 to the adjacent tubes 112 of the termination segment 100B. In some embodiments, the wrappers 124 include a spiral of wrapping material (e.g. a plastic strip or twine) around the termination segment 100B. In some embodiments, a single wrapper 124 is used to cover the entire termination segment 100B, e.g. a protective sleeve such as a thin plastic sleeve, a non-fray expandable sleeve, flat plastic tubing, adhesive heat shrink, the like, or a combination thereof. The wrapper 124 may further include a pulling sleeve that is applied around the optical cable 100, including a pulling loop at the end of the pulling sleeve in order to facilitate the installation of the optical cable 100 through a duct.

The one or more wrappers 124 may have a thickness less than or equal to 3 mm, such as in a range of 1 mm to 3 mm, so that the diameter of the termination segment 100B including the one or more wrappers 124 is no more than 10% greater than the diameter of the main body 100A without the one or more wrappers 124. In some embodiments, the end of the termination segment 100B opposite the main body 100A is covered by a wrapper 124 (e.g., plastic tubing) that is heat-sealed at the end to protect the end of the termination segment 100B. The one or more wrappers 124 are temporary and are removed after installation of the optical cable 100, including any protective sleeve, pulling sleeve, or pulling loop. In some embodiments, a portion of the main body 100A adjacent to the termination segment 100B is covered by the one or more wrappers 124.

Although not illustrated, the optical cable 100 may further include a second termination segment 100B on an opposite side of the main body 100A from the first termination segment 100B. The second termination segment 100B may have optical fibers pre-terminated by connectors 120 as described above with respect to the first termination segment 100B. However, in some embodiments, the connectors 120 are not staggered along the length of the second termination segment 100B. This is because the second termination segment 100B does not need to be installed through a duct, as only one termination segment of the optical cable 100 (e.g., the first termination segment 100B) must pass through a duct in most installation procedures.

FIG. 1B illustrates a cross-sectional view along cross-section 1B-1B through the main body 100A of the optical cable 100 as illustrated in FIG. 1A. As shown in FIG. 1B, in the main body 100A, the plurality of tubes 112 is surrounded by an outer layer 106. Although thirty-seven tubes are shown in FIG. 1B, this number is not necessarily indicative of the total number of tubes 112 that may be included in the optical cable 100. For example, the plurality of tubes 112 may include between 6 to 72 tubes.

The plurality of tubes 112 fits within an outer layer 106 of the main body 100A of the optical cable 100. The outer layer 106 may include a number of layers such as an outer jacket 118, a water blocking layer 108, and an optional strength member (not shown) or strength layer no. The outer jacket 118 may include polyurethane, polyethylene, nylon, or other suitable material. In one embodiment, the outer jacket 118 includes medium-density polyethylene, with a nominal outer jacket thickness of approximately 1 mm, so as to comply with the standards for fiber optic cables such as Telcordia, GR-20 and ICEA-640. Flame-retardant additives may also be included into the outer jacket 118. The water blocking layer 108 may include water blocking threads, water blocking tapes, or super absorbent powder type materials.

In some embodiments, the main body 100A has a first diameter $D_1$ (also referred to as a first outer diameter) across the cross-section 1B-1B in a range of 10 mm to 45 mm, such as 40 mm. This is advantageous so that the optical cable 100 can contain a sufficient number of optical fibers for applications such as hyperscale computing while still being able to be installed through ducts in computing facilities. The main body 100A having a diameter less than 6 mm may be disadvantageous by not containing a sufficient number of optical fibers. The main body 100A having a diameter greater than 60 mm may be disadvantageous by being too wide to be installed through ducts in computing facilities.

FIG. 1C illustrates a cross-sectional view along cross-section 1C-1C through the termination segment 100B of the optical cable 100 as illustrated in FIG. 1A. As an example, the cross-section 1C-1C is through a single connector 120 closest to the main body 100A (see above, FIG. 1A). The single connector 120 is bound to the plurality of tubes 112 by a wrapper 124. A second diameter $D_2$ (also referred to as a second outer diameter) is the maximum diameter of the termination segment 100B through any cross-section of the termination segment 100B along the length of the termination segment 100B. The second diameter $D_2$ is equal to or smaller than the first diameter $D_1$ (see above, FIG. 1B). In some embodiments, the diameter of the termination segment 100B is not constant along the termination segment 100B, and the termination segment 100B is not strictly cylindrical (e.g., due to the straight profiles of the connectors 120). As such, the second diameter $D_2$ is the diameter of a tight circle circumscribing the termination segment 100B at a position along the length of the termination segment 100B where the tight circle is largest (excluding the one or more wrappers 124). As illustrated in FIGS. 1A and 1C, the second diameter $D_2$ is through the single connector 120 closest to the main body 100A along the cross-section 1C-1C, but the second diameter $D_2$ may be through any cross-section of the termination segment 100B along the length of the termination segment 100B where the diameter of the termination segment 100B is largest.

In some embodiments, the termination segment 100B has a second diameter $D_2$ that is equal or greater than the first diameter $D_1$ of the main body 100A, where the second diameter $D_2$ is the maximum diameter of the termination segment 100B through any cross-section of the termination segment 100B along the length of the termination segment 100B. For example, the first diameter $D_1$ may be 30 mm or smaller and the second diameter $D_2$ may be 30 mm or larger, such as in a range of 30 mm to 40 mm. Although the second diameter $D_2$ may be larger than the first diameter $D_1$, the second diameter $D_2$ is still small enough to be installed through ducts in computing facilities.

In some embodiments, the second diameter $D_2$ is in a range of 6 mm to 45 mm, such as 40 mm. This is advantageous so that the optical cable 100 can contain a sufficient number of optical fibers for applications such as hyperscale computing while still being able to be installed through ducts in computing facilities. The termination segment 100B having a diameter less than 6 mm close may be disadvantageous by not containing a sufficient number of optical fibers. The termination segment 100B having a diameter greater than 60 mm may be disadvantageous by being too wide to be installed through ducts in computing facilities.

The second diameter $D_2$ being equal to or smaller than the first diameter $D_1$ is advantageous for installing the optical cable 100, which may have a high optical fiber count (e.g., 3000 or more optical fibers per cable, such as 144 to 10000 optical fibers per cable), through ducts designed to accommodate unterminated optical cables without pre-attached connectors. Pre-terminating the optical cable 100 by terminating its respective optical fibers with connectors 120 may reduce installation time of the optical cables significantly, such as from an installation time of 3 to 5 weeks to an installation time of 3 to 5 days. Labor costs for installation may be significantly reduced by moving the time-intensive and skill-intensive step of optical fiber termination from the installation process to the manufacturing process of the pre-terminated optical cable 100. For example, the pre-terminated optical cable 100 may not need to have its optical fibers spliced during installation. As such, reducing the installation time and necessary labor skill for installation may remove capital costs that cannot be deprecated.

The pre-terminated optical cable 100 may be installed through the same ducts or ducts (e.g., in hyperscale computing facilities) as used for unterminated optical cables with a similar or same number of optical fibers because the second diameter $D_2$ of the termination segment 100B of the pre-terminated optical cable 100 (including the connectors 120) is equal to or smaller than the first diameter $D_1$ of the main body 100A. This allows the pre-terminated optical cable 100 to be installed in existing ducts. The optical cable 100 disclosed herein meets a significant market need for pre-terminated high fiber count optical cables (e.g., 6912 optical fiber cables) in hyperscale computing that is currently unmet.

While prior art has included pre-terminated optical cables having connectors at staggered lengths from the main body of the optical cable, the present disclosure is the first to disclose a termination segment 100B of a pre-terminated optical cable 100 having a second diameter $D_2$ being equal to or smaller than a first diameter $D_1$ of the main body 100A of the pre-terminated optical cable 100. The prior art does not disclose this feature. Rather, it shows respective termination segments or the equivalent having wider diameters than the main bodies of the optical cables. This is disadvantageous because the pre-terminated optical cables of the prior art cannot be installed through ducts having widths designed to accommodate unterminated optical cables having a same or similar number of optical fibers. The pre-terminated optical cable 100 of the present disclosure may be installed in the ducts, unlike optical cables of the prior art.

Figure 1D:
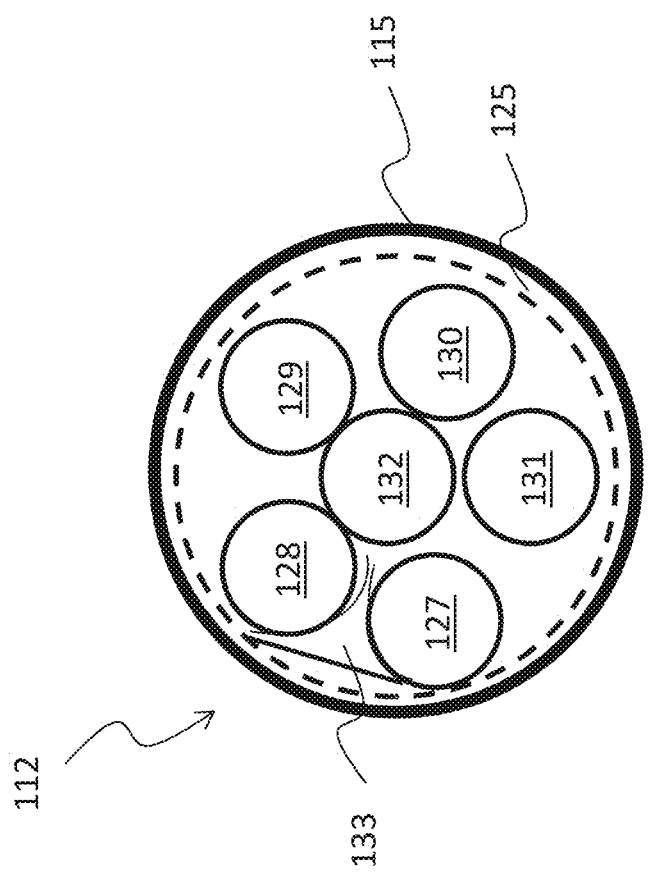
FIG. 1D illustrates a cross-sectional view of a tube of an optical cable in accordance with an embodiment.

FIG. 1D illustrates a cross-sectional view of a tube 112 of the optical cable 100 (see above, FIGS. 1A-1C), in accordance with some embodiments. The tube 112 includes one or more flexible ribbons 125 of optical fibers 126 joined together by intermittent bond regions 133 (see below, FIGS. 1E-1F) and a tube jacket 115 enclosing the one or more flexible ribbons 125. The one or more flexible ribbons 125 run length-wise down the tube 112. In one embodiment, the tube 112 may include a single flexible ribbon 125. In other embodiments, the tube 112 may include a plurality of flexible ribbons 125. In yet other embodiments, the tube 1124 may include a plurality of separate optical fibers not joined in a flexible ribbon 125. In other words, the tube 112 may contain optical fibers free of bonding material that forms bond regions 133 (see below, FIGS. 1E-1F).

In one or more embodiments, the tube jacket 115 may include a flexible material such as flame-retardant polyvinyl chloride (PVC), polypropylene (PP), polyvinylidene fluoride (PVDF), polybutylene terephthalate (PBT), or low smoke zero halogen (LSZH) compounds. In one or more embodiments, the tube jacket 115 may include a deformable material. The wall thickness of the tube jacket 115 is maintained to enable the flexibility of the one or more flexible ribbons 125 within the tube 112. Advantageously, although the tube jacket 115 may include a flexible material, the use of the tape in various embodiments helps to minimize pressure points on the tube jacket 115 by conforming the flexible ribbons 125 into a near circular shape.

In one or more embodiments, where each of the tubes 112 includes a plurality of flexible ribbons 125, the flexible ribbons 125 may be arranged so that they may be conformed together into a single compact core of flexible ribbons 125, and then wrapped with finished tape. Alternatively, each of the flexible ribbons 125 within a tube 112 may be rolled or folded into individual compact cores without finished tape, and then may be further rolled or folded into a single compact unit or bundle and wrapped with finished tape.

Figure 1E:
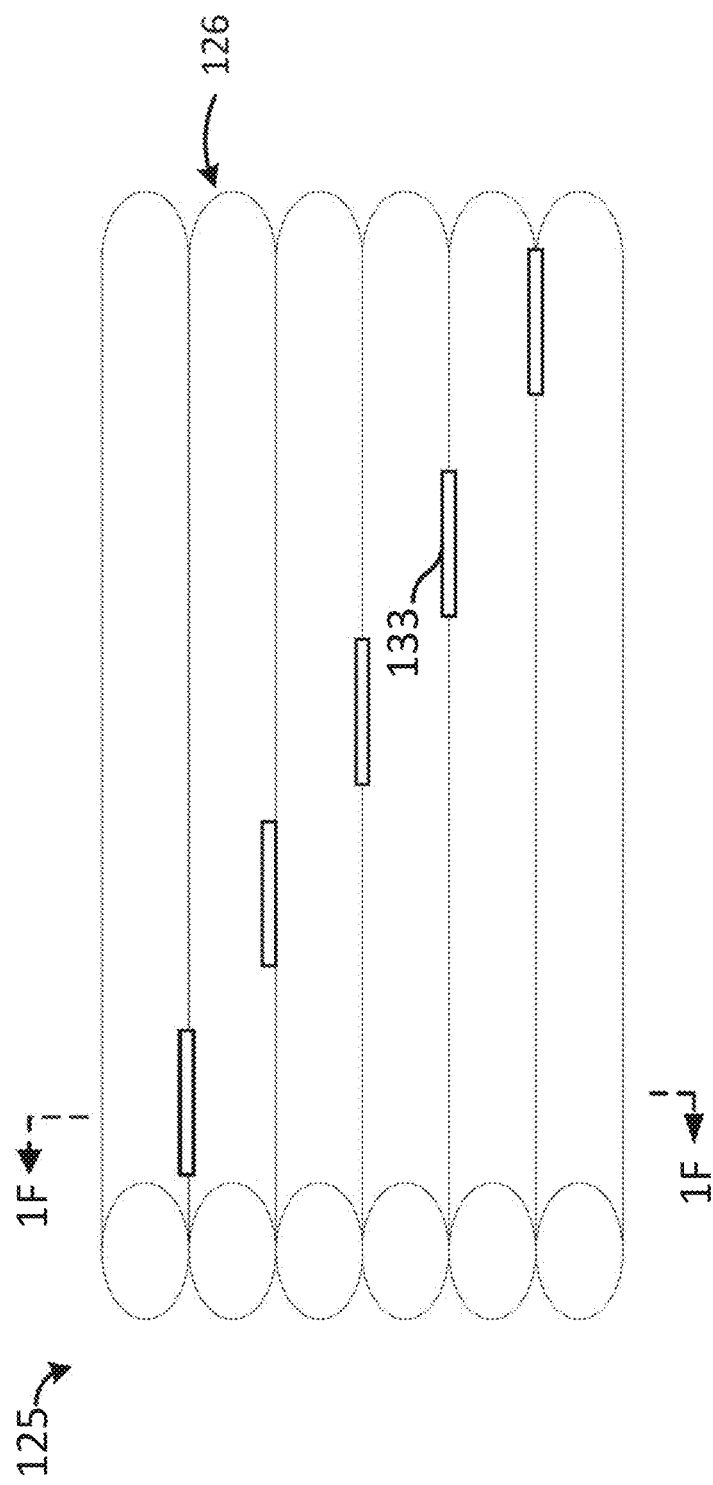
FIG. 1E illustrates a top view of a flexible ribbon of optical fibers in accordance with an embodiment.
Figure 1F:
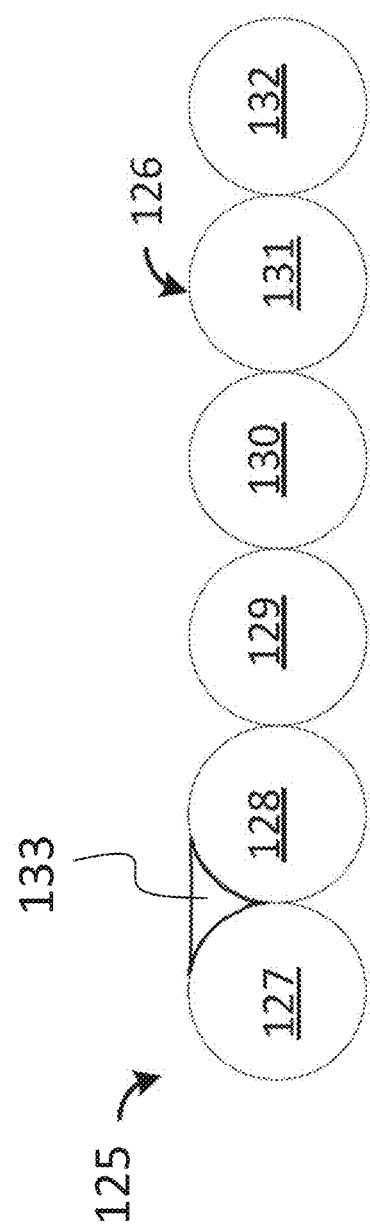
FIG. 1F illustrates a cross-sectional view of a flexible ribbon of optical fibers in accordance with an embodiment.

FIG. 1E illustrates a top view of an example flexible ribbon 125 of optical fibers 126 and FIG. 1F illustrates a cross-sectional view of the example flexible ribbon 125 along cross-section 1F-1F as shown in FIG. 1E, in accordance with some embodiments. The flexible ribbon 125 includes an array of a plurality of optical fibers 126. The plurality of optical fibers 126 are arranged as a parallel array such that the flexible ribbon 125 can be arranged in a substantially planar shape, as illustrated in FIG. 1F. As shown in FIG. 1E, the flexible ribbon 125 includes a plurality of optical fibers 126 such as the first, the second, the third, the fourth, the fifth, and the sixth optical fibers 127-132. FIGS. 1E and 1F are not indicative of the total number of optical fibers 126 although only six optical fibers are shown. The flexible ribbon 125 may include any suitable number of optical fibers 126. For example, the flexible ribbon 125 may include twelve optical fibers in one illustration. The optical fibers 126 may have a diameter in a range of 100 microns to 300 microns in various embodiments. For example, in one or more embodiments, each optical fiber in a flexible ribbon may have a diameter of 170 to 190 microns, 190 to 210 microns, or 235 to 255 microns, such as 180 microns, 200 microns or 245 microns.

As illustrated in FIGS. 1E and 1F, bond regions 133 are arranged across the flexible ribbon 125 in an intermittent manner to selectively leave a large surface of the plurality of optical fibers 126 free from the bonding material that forms the bond regions 133. Accordingly, each optical fiber is attached to a first neighboring optical fiber through the bond regions 133, which do not extend into the second neighboring optical fiber. Consequently, the plurality of optical fibers 126 maintain a large degree of freedom and the flexible ribbon 125 can be effectively folded or rolled into a compact bundle, resulting in an improved packing density. In addition, the flexible ribbon 125 can be effectively unfolded and unrolled back into a substantially planar configuration, as shown in FIG. 1E, which may be useful for mass fusion splicing.

In various embodiments, the bond regions 133 may comprise a matrix material acting as the bonding agent between the adjacent optical fibers 126. In one embodiment, the matrix material of the bond regions 133 may comprise an acrylic-based, light-cured instant adhesive, such as a UV cured acrylate material. In another embodiment, the matrix material of the bond regions 133 may comprise a cured resin. In alternative embodiments, the bond regions 133 may comprise other bonding materials such as a thermoplastic material.

Figure 1G:
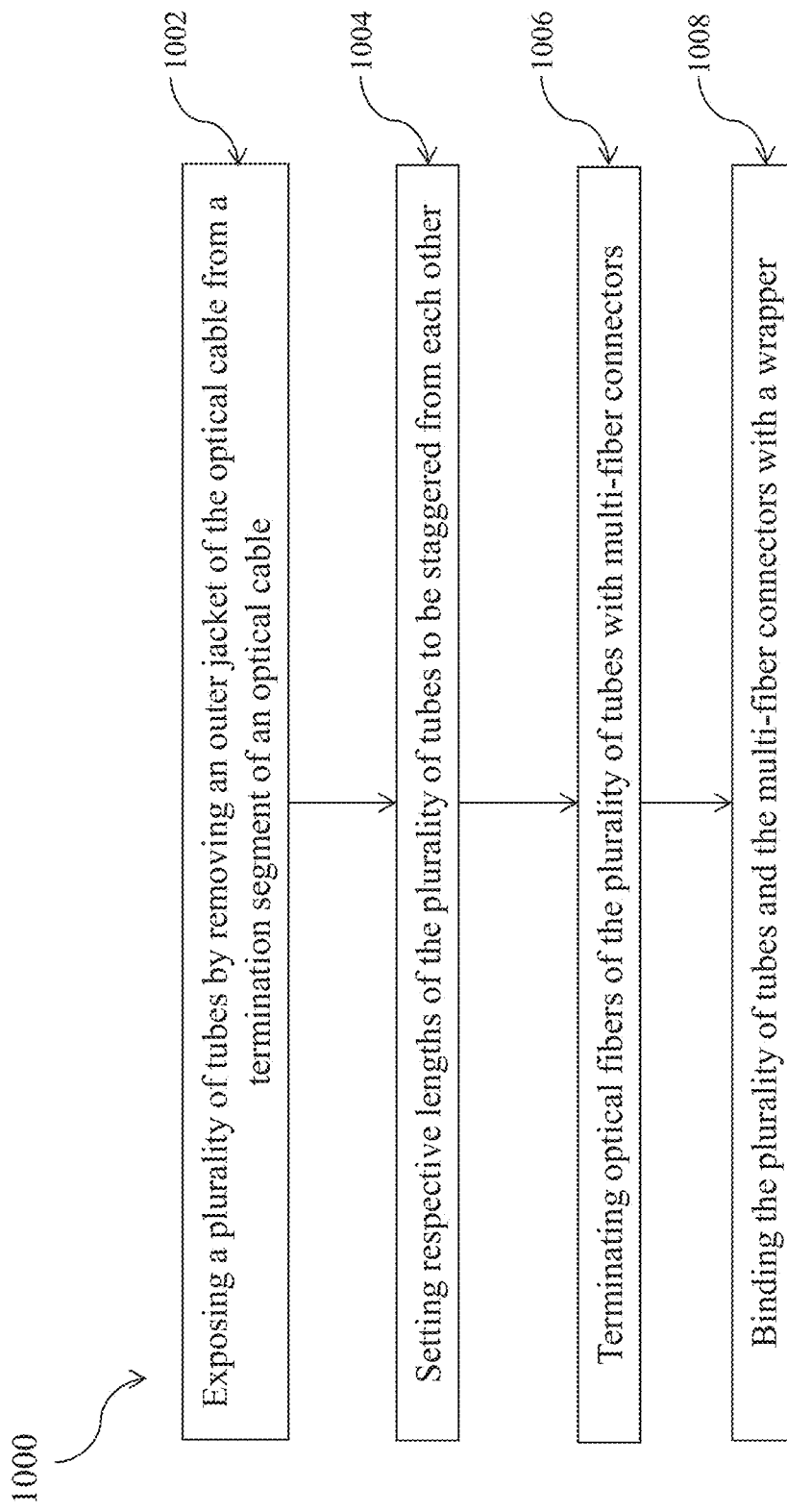
FIG. 1G is a flow chart of an embodiment method for manufacturing an optical cable.

FIG. 1G illustrates a flow chart of a method 1000 for manufacturing a pre-terminated optical cable 100, in accordance with some embodiments.

In step 1002, a plurality of tubes 112 are exposed by removing an outer jacket 118 of the optical cable 100 from a termination segment 100B of an optical cable. The termination segment 100B extends from a main body 100A of the optical cable 100 (see above, FIG. 1A). The main body has a first outer diameter $D_1$ (see above, FIG. 1B).

In step 1004, respective lengths of the plurality of tubes 112 are set to be staggered from each other.

In step 1006, optical fibers 126 (see above, FIGS. 1E-1F) of the plurality of tubes 122 are terminated with multi-fiber connectors 120 (see above, FIG. 1A). In some embodiments, setting respective lengths of the plurality of tubes 112 to be staggered from each other includes setting a first tube of the plurality of tubes 112 to a first length, the first length being shorter than the lengths of the remaining tubes 112 of the plurality of tubes 112. In some embodiments, setting respective lengths of the plurality of tubes to be staggered from each other includes setting a subset of tubes 112 of the plurality of tubes 112 to a second length, the second length being greater than the first length and greater than the lengths of the remaining tubes 112 of the plurality of tubes 112.

In step 1008, the plurality of tubes 112 and the multi-fiber connectors 120 are bound in the termination segment 100B with one or more wrappers 124 (see above, FIG. 1A). After binding the plurality of tubes and the multi-fiber connectors, the termination segment has a second diameter $D_2$ (see above, FIG. 1C) that is the same or smaller than the first diameter $D_1$.

Figure 2:
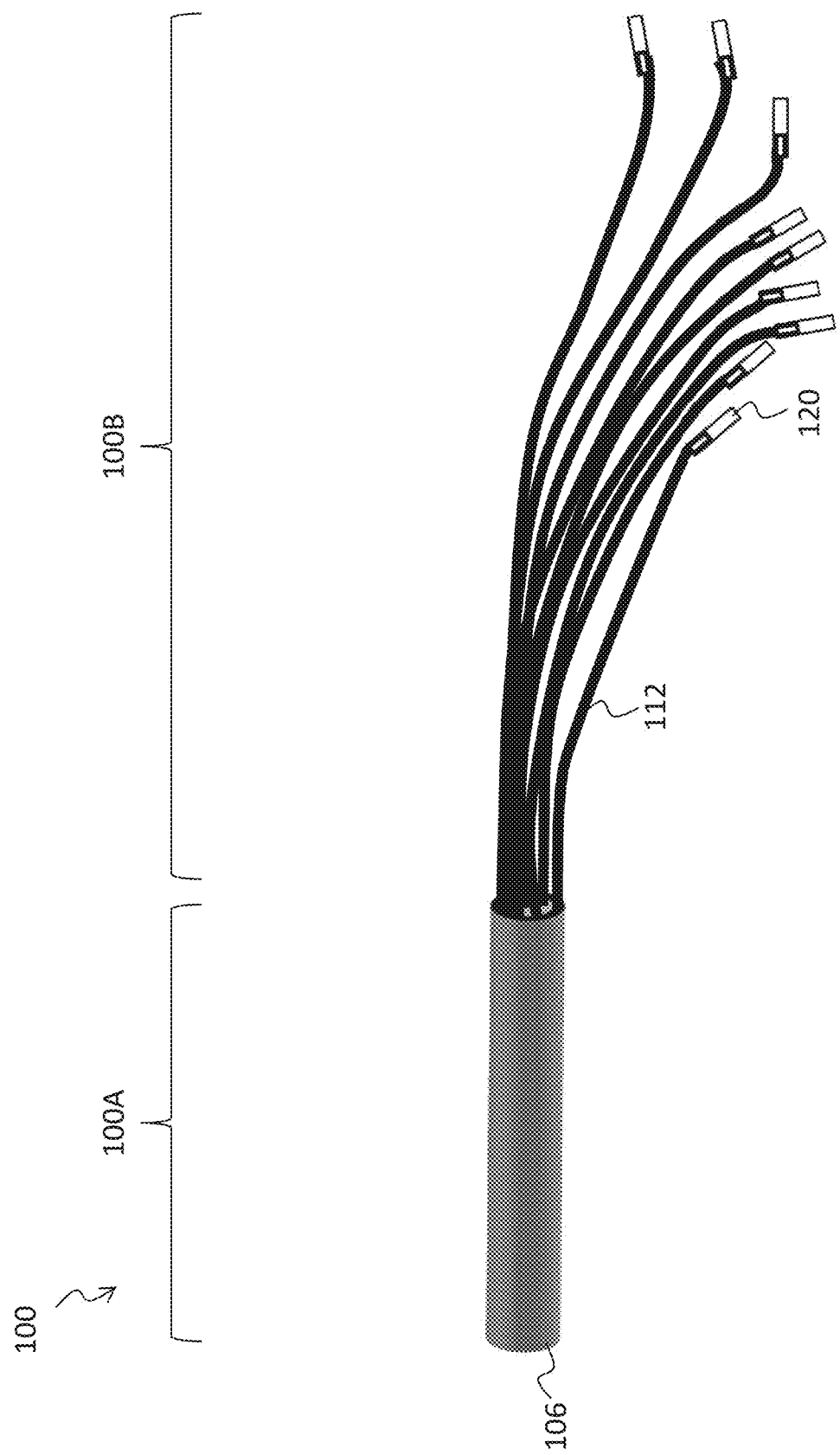
FIG. 2 illustrates a side view of the optical cable in accordance with an embodiment.

FIG. 2 illustrates a side view of the optical cable 100 after the wrappers 124 are removed from the termination segment 100B, in accordance with some embodiments. The connectors 120 are attached to tubes 112 at staggered lengths from the end of the main body 100A. Although FIG. 2 illustrates each tube 112 as terminated with a single respective connector 120, it should be appreciated that this is a non-limiting example. In various embodiments, two or more tubes 112 may be terminated by single connectors 120, or single tubes 112 may include optical fibers terminated by two or more respective connectors 120. The wrappers 124 may be removed after the optical cable 100 is installed through a duct (e.g., in a computing facility) by a suitable method, such as pushing, pulling, or blowing the optical cable 100 through the duct. Once the optical cable 100 is installed through the duct, the wrappers 124 are removed and the various pre-terminated tubes 112 or flexible ribbons 125 of optical fibers 126 (see above, FIGS. 1D-1G) may be connected through the connectors 120 to suitable connectors located in the computing facility.

Embodiments of the present invention are applicable to various types of optical cables and are intended to be constrained to a specific type of optical cable. Specifically, any type of cable that includes a termination segment may include the embodiments described in this application. This includes not only optical cables but also optical cables in various embodiments. One such illustration of an optical cable 200 is shown in FIGS. 3A and 3B in which a plurality of tubes 112 is formed around a central core.

Figure 3A:
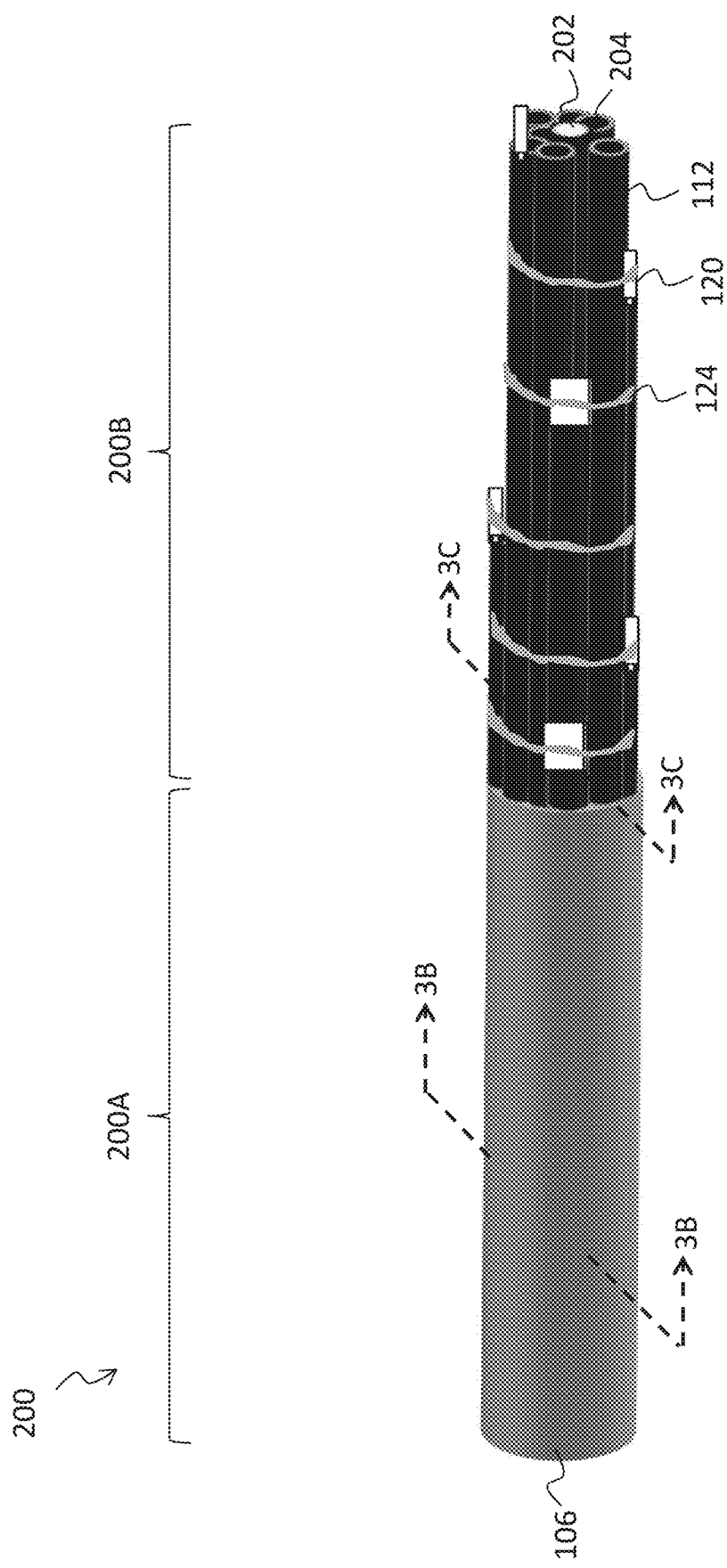
Figure 3B:
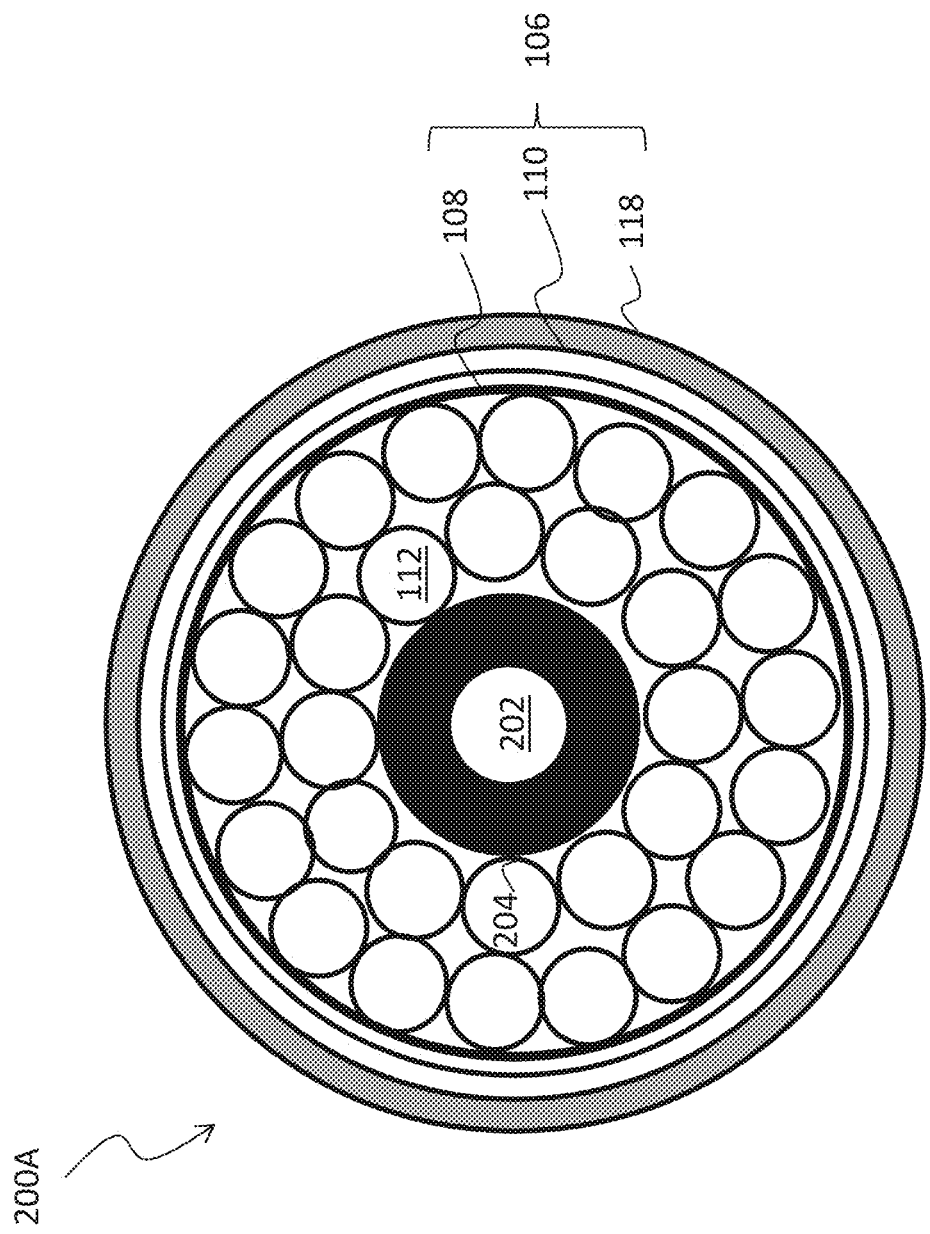
Figure 3C:
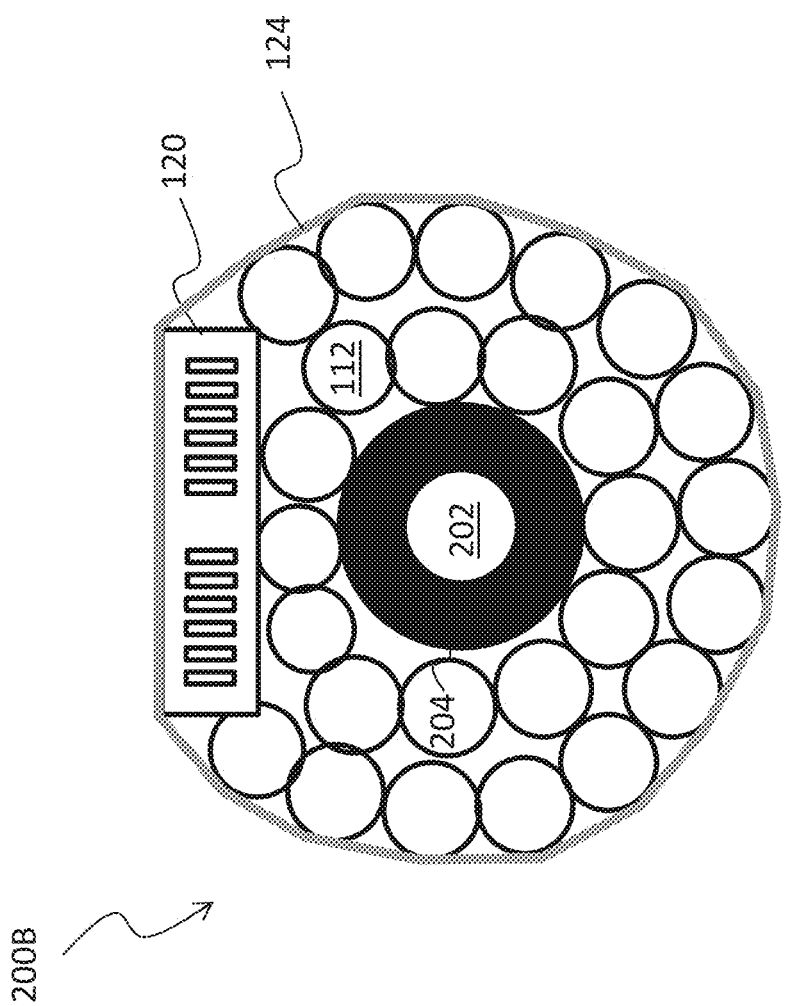

FIGS. 3A-3C illustrate a different type of optical cable in accordance with another embodiment of the present disclosure, where the optical cable includes a central strength member and a plurality of tubes including respective pluralities of optical fibers. FIG. 3A illustrates a side view of an optical cable 200 having a central core, FIG. 3B illustrates a cross-sectional view through a main body 200A of the optical cable 200 along cross-section 3B-3B as illustrated in FIG. 3A, and FIG. 3C illustrates a cross-sectional view through a termination segment 200B of the optical cable 200 along cross-section 3C-3C as illustrated in FIG. 3A.

The optical cable 200 is similar to the optical cable 100 as described above with respect to FIGS. 1A-2 but also including a central core. A central region of the optical cable 200 includes a central strength member 202 surrounded by a conventional upjacket 204. The central strength member 202 provides mechanical integrity for the optical cable 200 when experiencing heavy stress. For example, during installation the optical cable 200 may be put under significant strain. The central strength member 202 is a rigid material and is the primary anti-buckling element of the optical cable 200. The central strength member 202 resists cable contraction at low temperatures and prevents optical fiber buckling. The central strength member 202 prevents the optical cable 200 from being compressed and provides a primary clamping point for hardware used to connect to the optical cable 200 for routing enclosures.

The central strength member 202 may include metallic elements, glass reinforced composite rods, aramid reinforced composite rods, or composite rods made of some other high modulus, low coefficient expansion material such as carbon fiber.

In one or more embodiments, the central strength member 202 may be enclosed with an upjacket 204. In other embodiments, the upjacket 204 may be a deformable material. The upjacket 204 may include a polymer such as polypropylene, a material similar to the material of the tube jacket 113 (see above, FIG. 1D), or other polymetric materials such as cellular foam polymer like cellular impact modified nucleated polypropylene, for example. The upjacket 204 functions to maintain the proper outer diameter of the central strength member 202 required for the quantity and size of tubes 112 required for the optical cable 200. The upjacket 204 also functions to assist in maintaining cable rigidity within a reasonable range and lowers the overall cost of the optical cable 200. However, the thickness of the upjacket 204 must be limited to avoid introducing thermal stress onto the central strength member 202. In various embodiments, the diameter of the upjacket 204 may be greater than the diameter of the central strength member 202. In one or more embodiments, the central strength member 202 may not include an upjacket 204 because the tubes 112 provide sufficient packing density and relief from the built in stress of the optical cable 200.

As illustrated in FIGS. 3A-3C, a plurality of tubes 112 surround the central strength member 202 in one or more concentric rows such that the tubes 112 fit within an outer layer 106. Although thirty tubes 112 are shown surrounding the central strength member 202, this is not indicative of the number of tubes 112 that may be included within an optical cable 200. For example, in one or more embodiments, three concentric rows of tubes 112 of equal or unequal quantities may surround the central strength member 202. In one or more embodiments, additional strength members including the same material as the central strength member 202 may be formed concentrically around the central strength member 202 between the tubes 112 in any of the concentric rows.

Example embodiments of the disclosure are summarized here. Other embodiments can also be understood from the entirety of the specification as well as the claims filed herein.

Example 1. An optical cable including: a main body including middle portions of a plurality of optical fibers, the main body having a first outer diameter; and a first termination segment extending from a first end of the main body, the first termination segment having a second outer diameter equal to or smaller than the first outer diameter, the second outer diameter being a maximum diameter of the first termination segment through any cross-section of the first termination segment along the length of the first termination segment, the first termination segment including: first end portions of the plurality of optical fibers; and a first plurality of multi-fiber connectors, each multi-fiber connector of the first plurality of multi-fiber connectors being attached to respective first end portions of the plurality of optical fibers, where the first plurality of multi-fiber connectors are staggered along a length of the first termination segment.

Example 2. The optical cable of example 1, where the first termination segment is surrounded by a wrapper.

Example 3. The optical cable of example 2, where the first termination segment surrounded by the wrapper has a third outer diameter, the third outer diameter being no more than 10% greater than the first outer diameter.

Example 4. The optical cable of example 1, where the first plurality of multi-fiber connectors are arranged at positions distributed along a length of the first termination segment, where a single multi-fiber connector of the first plurality of multi-fiber connectors is arranged at a first position closest to the main body, and where two or more multi-fiber connectors of the plurality of multi-fiber connectors are arranged at a second position farthest from the main body.

Example 5. The optical cable of example 1, where the plurality of optical fibers includes more than 3000 optical fibers.

Example 6. The optical cable of example 1, where the first plurality of multi-fiber connectors includes 20 or more multi-fiber connectors.

Example 7. The optical cable of example 1, further including a second termination segment extending from a second end of the main body, the second end being opposite the first end.

Example 8. The optical cable of example 7, where the second termination segment has a fourth outer diameter equal to or smaller than the first outer diameter.

Example 9. The optical cable of example 7, where the second termination segment includes a second plurality of multi-fiber connectors, each multi-fiber connector of the second plurality of multi-fiber connectors being attached to respective second end portions of the plurality of optical fibers.

Example 10. An optical cable including: a plurality of tubes, each of the plurality of tubes including a respective plurality of optical fibers; and a plurality of multi-fiber connectors, each multi-fiber connector of the plurality of multi-fiber connectors being attached to an end of a respective tube of the plurality of tubes, the plurality of multi-fiber connectors being staggered along a termination segment of the optical cable, the termination segment being at the end of a main body of the optical cable, where a largest outer diameter of the termination segment is equal to or smaller than an outer diameter of the main body.

Example 11. The optical cable of example 10, where the optical cable includes a central strength member.

Example 12. The optical cable of example 10, where each respective plurality of optical fibers is arranged in one or more ribbons.

Example 13. The optical cable of example 12, where a ribbon of the one or more ribbons is a flexible ribbon.

Example 14. The optical cable of example 13, where the flexible ribbon includes intermittent bonds between adjacent optical fibers of the flexible ribbon.

Example 15. The optical cable of example 10, where the plurality of multi-fiber connectors includes a subset of multi-fiber connectors, the subset of multi-fiber connectors being a first distance from the main body, the first distance being measured along respective tubes of the plurality of tubes extending between the main body and each multi-fiber connector of the subset of multi-fiber connectors.

Example 16. The optical cable of example 15, where the remainder of the plurality of multi-fiber connectors besides the subset of multi-fiber connectors have respective distances from the main body smaller than the first distance.

Example 17. The optical cable of example 16, where the respective distances from the main body of the remainder of the plurality of multi-fiber connectors are different from each other.

Example 18. A method of manufacturing a pre-terminated optical cable, the method including: exposing a plurality of tubes by removing an outer jacket of an optical cable from a termination segment of the optical cable, the termination segment extending from a main body of the optical cable, the main body having a first diameter; setting respective lengths of the plurality of tubes to be staggered from each other; terminating optical fibers of the plurality of tubes with multi-fiber connectors; and binding the plurality of tubes and the multi-fiber connectors in the termination segment with a wrapper, where after binding the plurality of tubes and the multi-fiber connectors, the termination segment excluding the wrapper has a second diameter, the second diameter being the same or smaller than the first diameter.

Example 19. The method of example 18, where setting respective lengths of the plurality of tubes to be staggered from each other includes setting a first tube of the plurality of tubes to a first length, the first length being shorter than the lengths of the remaining tubes of the plurality of tubes.

Example 20. The method of example 19, where setting respective lengths of the plurality of tubes to be staggered from each other further includes setting a subset of tubes of the plurality of tubes to a second length, the second length being greater than the first length and greater than the lengths of the remaining tubes of the plurality of tubes.

Example 21. An optical cable including: a main body including middle portions of a plurality of optical fibers; and a first termination segment extending from a first end of the main body, the first termination segment including: first end portions of the plurality of optical fibers; and a first plurality of multi-fiber connectors, each multi-fiber connector of the first plurality of multi-fiber connectors being attached to respective first end portions of the plurality of optical fibers, where the first plurality of multi-fiber connectors are staggered along a length of the first termination segment.

While not being restrictive to any one configuration of optical cables, embodiments of the present application may be applied to high density optical cables comprising deformable buffer tubes and flexible ribbon, for example, as described in U.S. patent application Ser. No. 16/213,491 filed Dec. 7, 2018, Ser. No. 16/028,264 filed Jul. 5, 2018, and Ser. No. 17/649,518 filed Jan. 31, 2022, which are all incorporated by reference herein.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical cable comprising:
    a plurality of optical fibers, the plurality of optical fibers comprising multiple bunches of optical fibers;
    an outer layer covering a first length portion of the plurality of optical fibers, a second length portion of the plurality of optical fibers extending beyond an edge of the outer layer; and
    a plurality of multi-fiber connectors, each multi-fiber connector of the plurality of multi-fiber connectors being coupled to a respective bunch of optical fibers, wherein the plurality of multi-fiber connectors is arranged at positions distributed along a length of a termination segment of the optical cable, the termination segment extending from the edge of the outer layer, wherein, at a first position closest to the edge of the outer layer, only one multi-fiber connector of the plurality of multi-fiber connectors is arranged, and wherein, at a second position farthest from the edge of the outer layer, two or more multi-fiber connectors of the plurality of multi-fiber connectors are arranged such that a total number of multi-fiber connectors per cross sectional area of the termination segment increases from the edge of the outer layer towards an end of the optical cable along the length of the termination segment.

2. The optical cable of claim 1, wherein the only one multi-fiber connector terminates a number of optical fibers in a range of 12 to 144.

3. The optical cable of claim 1, wherein the plurality of multi-fiber connectors comprises 5 to 500 multi-fiber connectors.

4. The optical cable of claim 1, wherein the plurality of multi-fiber connectors are positioned at n axial positions, wherein n is in a range of 10 to 80.

5. The optical cable of claim 1, further comprising a wrapper around the second length portion of the plurality of optical fibers, the wrapper having a thickness less than or equal to 3 mm.

6. The optical cable of claim 5, wherein a total diameter of the wrapper and the second length portion of the plurality of optical fibers is in a range of 30 mm to 40 mm.

7. The optical cable of claim 1, wherein the plurality of optical fibers comprises 144 to 10000 optical fibers.

8. The optical cable of claim 1, further comprising a central strength member, the central strength member being surrounded by the plurality of optical fibers.

9. The optical cable of claim 1, wherein the plurality of optical fibers is arranged in flexible ribbons.

10. An optical cable comprising:
    a main body comprising middle portions of a plurality of optical fibers; and
    a first termination segment extending from an end of the main body, the first termination segment comprising:
        end portions of the plurality of optical fibers, each end portion being continuous with a respective middle portion; and
        a plurality of multi-fiber connectors, each multi-fiber connector of the plurality of multi-fiber connectors being attached to respective end portions of the plurality of optical fibers, wherein the plurality of multi-fiber connectors is arranged at positions distributed along a length of the first termination segment, wherein, at a first position closest to the main body, only one multi-fiber connector of the plurality of multi-fiber connectors is arranged, and wherein, at a second position farthest from the main body, two or more multi-fiber connectors of the plurality of multi-fiber connectors are arranged such that a total number of multi-fiber connectors per cross sectional area of the termination segment increases from the end of the main body towards an end of the optical cable along the length of the first termination segment.

11. The optical cable of claim 10, wherein two or more multi-fiber connectors at the second position comprise a first multi-fiber connector and a second multi-fiber connector, the second position being at a first distance from the end of the main body, wherein the only one multi-fiber connector at the first position comprises a third multi-fiber connector of the plurality of multi-fiber connectors, the first position being at a second distance from the end of the main body, the second distance being less than the first distance, and wherein a fourth multi-fiber connector of the plurality of multi-fiber connectors is at a third distance from the end of the main body, the third distance being different from the first distance and the second distance.

12. The optical cable of claim 11, wherein the third distance is greater than the first distance.

13. The optical cable of claim 11, wherein the third distance is less than the first distance and greater than the second distance.

14. The optical cable of claim 11, wherein a fifth multi-fiber connector of the plurality of multi-fiber connectors is at the third distance from the end of the main body.

15. The optical cable of claim 11, wherein the fourth multi-fiber connector of the plurality of multi-fiber connectors is the sole multi-fiber connector at the third distance from the end of the main body.

16. A method of manufacturing a pre-terminated optical cable, the method comprising:
    exposing a plurality of tubes by removing an outer jacket of an optical cable from a termination segment of the optical cable, the termination segment extending from a main body of the optical cable;
    setting a length of a first tube of the plurality of tubes to a first length;
    setting respective lengths of a second tube and third tube of the plurality of tubes to a second length, the second length being greater than the first length;
    setting respective lengths of the remaining tubes of the plurality of tubes to lengths greater than the first length;
    terminating optical fibers of the plurality of tubes with multi-fiber connectors, wherein a total number of multi-fiber connectors per cross sectional area of the termination segment increases from an end of the main body towards an end of the optical cable along the length of the termination segment; and binding the plurality of tubes and the multi-fiber connectors in the termination segment with a wrapper.

17. The method of claim 16, wherein the wrapper covers the entire termination segment.

18. The method of claim 16, wherein the wrapper further includes a pulling sleeve and a pulling loop coupled to the pulling sleeve.

19. The method of claim 16, wherein each tube of the plurality of tubes comprises a flexible ribbon of optical fibers.

* * * * *